W. TETLEY.
Apparatus for Holding Meat in Cutting.

No. 167,710. Patented Sept. 14, 1875.

WITNESSES:
E. Wolff
A. F. Terry

INVENTOR:
W. Tetley
BY
ATTORNEYS.

N. PETERS, PHOTO-LITHOGRAPHER, WASHINGTON, D. C.

UNITED STATES PATENT OFFICE.

WILLIAM TETLEY, OF PANA, ILLINOIS.

IMPROVEMENT IN APPARATUS FOR HOLDING MEAT IN CUTTING.

Specification forming part of Letters Patent No. 167,710, dated September 14, 1875; application filed February 13, 1875.

*To all whom it may concern:*

Be it known that I, WILLIAM TETLEY, of Pana, in the county of Christian and State of Illinois, have invented a new and useful Improvement in Meat-Holder, of which the following is a specification:

The invention will first be fully described, and then pointed out in the claim.

Figure 1:
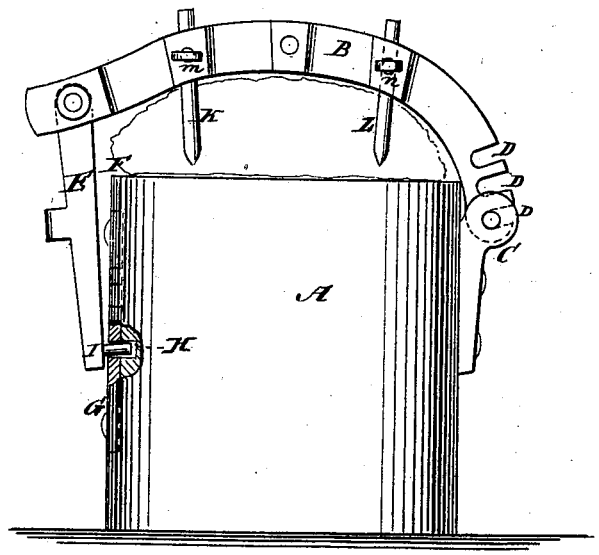
Figure 2:
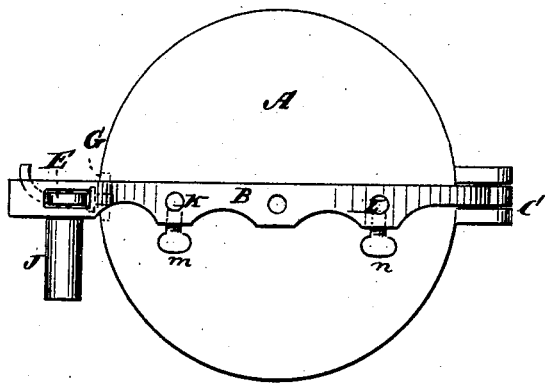

In the accompanying drawing, Figure 1 is a side elevation of the block, showing the holder attached thereto. Fig. 2 is a top view of the same.

Similar letters of reference indicate corresponding parts.

A represents the block on which the meat is laid. B is the holding-bar, which may be of any form, but preferably curved upward, as seen in Fig. 1. This bar is hinged to the block, as seen at C, and the hinge may be adjustable by means of slots D, or by holes, or in any other manner, so that the bar may be raised or lowered according to the size of the piece of meat to be confined under it. The other end of the bar is fastened to the opposite side of the block by means of the hanging bar or hasp E, or in any other suitable manner.

The end of the bar B may be curved downward over the corner or angle F of the block and be fastened on the side by means of a snap-hook or other fastening. In this example of my invention it is fastened by the bar E. G is a plate, having one or more holes, H, which is fastened to the side of the block. I is a pin in the lower end of the bar E, which is made to enter one of the holes in the plate, as represented. A hook and plate of any other suitable kind may be used for this purpose. J is a short stud on the side of the bar B for convenience in handling and adjusting that bar. K and L are sharp adjustable pins or points through the bar B. These pins are metal, and penetrate the meat when the bar is pressed down. They are adjusted to penetrate more or less by means of the set-screws *m n*. These pins may be removed entirely when considered necessary, and any number may be used. The holder and parts connected with it are made of metal preferably.

By means of this holder the sawing off of steaks of beef, and sawing and cutting other pieces, is greatly facilitated.

Having fully described my invention, I claim as new and desire to secure by Letters Patent—

A detachable meat-holder for butcher-blocks, consisting of lever B having the front hook E, rear fulcrum-bearings D, and intermediate pins K L, as shown and described.

WILLIAM TETLEY.

Witnesses:
SAMUEL MILLER,
WM. MURRAY.